Patented Sept. 1, 1942

2,294,394

UNITED STATES PATENT OFFICE 2,294,394

PIGMENT OF IMPROVED TEXTURE

Archibald M. Erskine, Chatham, and Ben H. Perkins, Sea Bright, N. J., assignors to E. I. du Pont de Nemours & Company, Wilmington, Del., a corporation of Delaware No Drawing. Application August 3, 1940, Serial No. 351,100

19 Claims. (Cl. 106—304)

This invention relates to the manufacture of pigments and more particularly to the manufacture of dry pigments of improved texture. Still more particularly it relates to the manufacture of dry pigments with greatly improved ease of dispersion in organic vehicles.

The processes of manufacturing dry pigments by precipitation from aqueous solutions, filtering, washing free from soluble salts, drying, and finally grinding to a fine powder are well known in the art. To a very large extent, the subsequent use of these pigments involves their incorporation into vehicles, principally of an organic nature, for use as decorative and protective media in coating compositions. It is obvious that the value of the pigments for these purposes will depend to a large extent on the degree of dispersion in the vehicle. The ideal dispersion for any given pigment appears to be that in which it is broken down substantially to the primary particles which were formed during the precipitation process.

Most pigments undergo a certain amount of aggregation during the various processing steps, particularly during the drying when more or less cementation of the particles appears to take place. The breaking down of these aggregates to reach the ultimate desired degree of dispersion in the vehicle is usually effected in two steps, the first being dry grinding to a fine powder and the second being the incorporation, or the grinding, of the pigment into the vehicle. Each of these steps requires the expenditure of a relatively large amount of energy and methods of reducing this expenditure of energy have been long sought.

Pigments appear to differ widely in the difficulty of their dispersion in vehicles. Certain pigments such as iron blues, phthalocyanine pigments, vat dye pigments, para red, and the like have been well known in the art as being very difficult to grind to a reasonably fine state of subdivision. With certain other pigments, the difficulty is much less pronounced but it is believed that most, if not all, of the commonly used pigments require some grinding to disperse them in the usual organic vehicles.

Various methods of solving these difficulties have been proposed in the past. For instance, there are some more or less related methods using volatile agents which have been added, usually to the aqueous paste, before drying. Thus on the one hand, water immiscible volatile liquids such as toluene, have been used and in another instance certain water miscible solvents such as the mono butyl ether of ethylene glycol have been used. Experience has shown that these prior art processes are somewhat limited in their application. Furthermore, the processes tend to be expensive because of the necessity of using elaborate recovery systems to prevent the loss of treating agents which do not add to the yield of the pigment.

It is an object of this invention to manufacture pigments of improved texture. A further object is to improve the ease of dispersion of pigments in vehicles. Additional objects will become apparent from an examination of the following description and claims.

These objects are attained according to the herein described invention which comprises mixing with an aqueous suspension of the pigment prior to the removal of water by drying a compound selected from the group consisting of naphthenyl alcohol and the esters and amides of naphthenic acid.

In describing this invention, it is necessary to describe a means of measuring the results obtained by its application. The degree of dispersion of a pigment in a vehicle resulting from a grinding operation may be demonstrated through the examination of at least two measurable properties. One of these is generally known as the "rate of strength development" and is a measure of the amount of grinding required to develop the maximum tinting strength or the ability to color a pigment of contrasting shade, e. g., the ability of a colored pigment to tint a white pigment in the same vehicle. The other measurable property is the amount of "grit" or the relative number and size of all particles which can be seen by the unaided eye in a thin film of the coating composition. Although these properties are related up to a certain point, experience has shown that in the final stages of dispersion they are largely independent and each highly important.

The importance of the development of the maximum tinting strength of a color is largely economic since it is reflected in the money value of the pigment to the user. Likewise, the rate of strength development is also important to the user, since it determines largely the amount of grinding necessary to develop the maximum tinting strength. The tinting strength of a colored pigment is easily measured by adding a predetermined amount of a pigment dispersed in a vehicle to a white coating composition. The rate of strength development is also easily measured by taking samples of the pigment-oil composition at various stages of the grinding and comparing the strength to the ultimate strength obtained by continued grinding.

The presence of grit in a coating composition is reflected in a number of ways in the use of the same. For instance, in the use of paints and enamels, grit may result in poor gloss in the dry film. In printing ink grit tends to fill the fine screen of high grade printing plates so that they function poorly. In the measurement of grit, the method described by T. J. Craig in "The American Ink Maker," October and November issues, (1938) may be used to evaluate the pigment. In this method, printing inks are made by grinding the pigments into a suitable vehicle, such as a lithographic varnish, on a roller mill with a controlled setting of the clearance between the rolls. Samples of the ink can be taken after any desired number of passes over the mill and the inks are evaluated by pulling down a wedge of ink on a glass slide as more fully described by Craig in the above reference. Arbitrary standards have been established in which the number 20 has been assigned to an ink which is free from any grit that can be detected with the unaided eye and 11 has been assigned to an ink which shows a very large amount of grit. The intervening numbers have been assigned in such a way as to represent approximately equal gradation in the amount of grit. Although these ratings are on a purely arbitrary basis, nevertheless, when suitable standards for comparison are available and the grinds are made under controlled conditions, they are readily duplicable and are considered to represent an accurate measure of the ease with which the pigment may be incorporated into the vehicle.

In the examples which follow hereafter the grit ratings were made on inks which had been given two passes over a loosely set roller mill, the clearance of the roll having been adjusted to a substantially reproducible point with the aid of feeler gauges. This represents, in general, a very superficial grinding operation and improvements in the rating should be reflected in a real value to the user of the pigment.

In the addition of treating agents to aqueous suspensions of pigments, it is generally preferred to add them to the slurries prior to any filtration step since thorough agitation and mixing are more readily effected at this stage. However, in some cases this procedure is not desirable because of the solubility of the treating agent and its consequent elimination during the filtration operation, and in such cases it is better to add the agent to the aqueous paste just prior to drying. It is understood that either procedure is applicable to this invention.

This invention may be more readily understood from an examination of the following examples which are given for illustrative purposes and are not intended to place any restrictions or limitations on the herein described invention. In all cases parts are given by weight.

Example I 1500 parts of a Milori Blue slurry, obtained by reacting a solution of ferrous sulfate and ammonium sulfate with a solution of sodium ferrocyanide and subsequently oxidizing in the usual manner and containing about 60 parts of dry pigment was thoroughly mixed with 4.2 parts of ethyl naphthenate and stirred overnight at room temperature. It was then filtered, washed repeatedly with warm water and dried in an oven. The dry pigment was ground in lithographic varnish on a loosely set ink mill. When examined for grit the rating was 15 as compared to 13 for an untreated control.

Example II

An Iron Blue slurry similar to that in Example I was treated with naphthenyl naphthenate (4.2 parts to 1500 parts of slurry). The grit rating or the dry color was 15 as compared to 13 for the control.

Example III 4.2 parts of the anilide of naphthenic acid was used in place of the ethyl naphthenate in Example I to give a dry product of equal merit which is substantially superior to the untreated control in texture.

Example IV

Naphthenyl alcohol was also used to replace the ethyl naphthenate in Example I with substantially the same beneficial results.

It is to be understood that the herein described specific embodiments of this invention may be subjected to variation and modification without departing from the scope and spirit of this invention. Thus, the method of preparing the pigment is not a part of this invention. The treatment may be applied to unwashed slurries, to washed slurries, and to press cakes. The optimum point of addition is not necessarily the same for all pigments but it is readily determined by one skilled in the art.

Although the treatments have been described with iron blues it is to be understood that the invention is not limited thereto since it applies broadly to the treatment of all pigments. Thus, it may be applied to such varied types of pigments as chrome yellows, chrome greens, azo pigments, vat dye pigments, phthalocyanine pigments, titanium oxide pigments, and the like. In the case of pigments which are calcined during manufacture the treatment should be applied subsequent to calcination in order to prevent the destruction of the organic treating agent by the high temperatures.

The agents employed according to the herein described invention include naphthenyl alcohol, the esters of naphthenic acid such as ethyl naphthenate, naphthenyl naphthenate, butyl naphthenate, and the like, and the amides of naphthenic acid such naphtheneamide, naphthenetoluidides, naphthenanilide, and the like.

The amount of agent employed is not critical and can be varied over a wide range. Economic considerations limit the practical use in two ways. First, the agents increase the cost of the pigments and the minimum increase is desirable; and secondly, a large amount of agent exerts undesirable effects on the pigment and properties other than texture which is invariably improved. An amount of agent between about 0.5% and about 15%, based upon the weight of dry pigment, and preferably between about 1% and about 7%, is recommended.

The other details of processing such as temperature of materials during the treatment, the time and type of agitation, the conditions of drying and the like are not, generally speaking critical and, where optima exists, they are readily determined by experiments which are within the skill of the workers in the art.

It is believed that poor texture in pigments results, generally, from aggregation and cementation of primary particles. The agents of this invention appear to function as if they coated the primary particles with a film which prevented firm cementation so that the particles may be separated with a very small amount of work being done on them.

The advantages of this invention are manifest in the improved texture of pigments made by this process. This improved texture results in superior coating compositions characterized by a minimum or complete absence of grit and the development of full color strength with a minimum of grinding.

The advantages to the user of the pigment are manifested in the superior quality of the resulting products and in a substantial increase in the rate of production, resulting both from a decrease in the amount of grinding necessary and from the ability to run a thicker film of material on the mill since it is unnecessary to set the rolls as closely as has heretofore been needed.

As many apparently widely different embodiments of this invention may be made without departing from the spirit and scope thereof, it is to be understood that we do not limit ourselves to the specific embodiment except as defined in the appended claims.

Having described the present invention the following is claimed as new and useful:

1. A process for the production of improved pigments which comprises mixing with an aqueous suspension of a pigment, prior to the removal of water by drying, a member selected from the group consisting of the esters and amides of naphthenic acid.

2. A process for the production of improved pigments which comprises mixing with an aqueous suspension of a pigment, prior to the removal of water by drying, between about 0.5% and about 15%, based upon the weight of the pigment, of a member selected from the group consisting of the esters and amides of naphthenic acid.

3. A process for the production of improved pigments which comprises mixing with an aqueous suspension of a colored pigment, prior to the removal of water by drying, a member selected from the group consisting of the esters and amides of naphthenic acid.

4. A process for the production of improved pigments which comprises mixing with an aqueous suspension of a colored pigment, prior to the removal of water by drying, between about 0.5% and about 15%, based upon the weight of the pigment, of a member selected from the group consisting of the esters and amides of naphthenic acid.

5. A process for the production of improved pigments which comprises mixing with an aqueous suspension of an iron blue pigment, prior to the removal of water by drying, a member selected from the group consisting of the esters and amides of naphthenic acid.

6. A process for the production of improved pigments which comprises mixing with an aqueous suspension of an iron blue pigment, prior to the removal of water by drying, between about 1% and about 7%, based upon the weight of the pigment, of a member selected from the group consisting of the esters and amides of naphthenic acid.

7. A process for the production of improved pigments which comprises mixing with an aqueous suspension of a pigment, prior to the removal of water by drying, between about 0.5% and about 15%, based upon the weight of the pigment, of an ester of naphthenic acid.

8. A process for the production of improved pigments which comprises mixing with an aqueous suspension of a pigment, prior to the removal of water by drying, between about 0.5% and about 15%, based upon the weight of the pigment, of naphthenyl naphthenate.

9. A process for the production of improved pigments which comprises mixing with an aqueous suspension of a pigment, prior to the removal of water by drying, between about 0.5% and about 15%, based upon the weight of the pigment, of an amide of naphthenic acid.

10. A process for the production of improved pigments which comprises mixing with an aqueous suspension of a pigment, prior to the removal of water by drying, between about 0.5% and about 15%, based upon the weight of the pigment, of naphthenanilide.

11. An improved pigment having intimately combined therewith a member selected from the group consisting of the esters and amides of naphthenic acid.

12. An improved pigment having intimately combined therewith between about 0.5% and about 15%, based upon the weight of the pigment, of a member selected from the group consisting of the esters and amides of naphthenic acid.

13. An improved colored pigment having intimately combined therewith a member selected from the group consisting of the esters and amides of naphthenic acid.

14. An improved colored pigment having intimately combined therewith between about 0.5% and about 15%, based upon the weight of the pigment, of a member selected from the group consisting of the esters and amides of naphthenic acid.

15. A process for the production of improved pigments which comprises mixing with an aqueous suspension of an iron blue pigment, prior to the removal of water by drying, between about 0.5% and about 15%, based upon the weight of the pigment, of an amide of naphthenic acid.

16. A process for the production of improved pigments which comprises mixing with an aqueous suspension of an iron blue pigment, prior to the removal of water by drying, between about 0.5% and about 15%, based upon the weight of the pigment, of naphthenanilide.

17. An improved pigment having intimately combined therewith between about 0.5% and about 15%, based upon the weight of the pigment, of an amide of naphthenic acid.

18. An improved iron blue pigment having intimately combined therewith between about 0.5% and about 15%, based upon the weight of the pigment, of an amide of naphthenic acid.

19. An improved iron blue pigment having intimately combined therewith between about 0.5% and about 15%, based upon the weight of the pigment, of naphthenanilide.

ARCHIBALD M. ERSKINE.
BEN H. PERKINS.